(12) United States Patent
Kobayashi et al.

(10) Patent No.: US 12,437,899 B2
(45) Date of Patent: Oct. 7, 2025

(54) COVERED WIRE

(71) Applicant: SUMITOMO WIRING SYSTEMS, LTD., Mie (JP)

(72) Inventors: Kenta Kobayashi, Mie (JP); Takeo Maruchi, Mie (JP); Hiroyuki Yoshikawa, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 157 days.

(21) Appl. No.: 17/920,627

(22) PCT Filed: Apr. 27, 2021

(86) PCT No.: PCT/JP2021/016840
§ 371 (c)(1),
(2) Date: Oct. 21, 2022

(87) PCT Pub. No.: WO2021/221068
PCT Pub. Date: Nov. 4, 2021

(65) Prior Publication Data
US 2023/0154651 A1    May 18, 2023

(30) Foreign Application Priority Data

Apr. 28, 2020 (JP) ................................ 2020-079825

(51) Int. Cl.
*H01B 7/42* (2006.01)

(52) U.S. Cl.
CPC .................................. *H01B 7/423* (2013.01)

(58) Field of Classification Search
CPC ............ H01B 7/423; H01B 7/42; B60R 16/02
See application file for complete search history.

(56) References Cited

U.S. PATENT DOCUMENTS

| | | |
|---|---|---|
| 2007/0199730 A1 | 8/2007 | Fazakas |
| 2011/0140517 A1 | 6/2011 | Kusakari et al. |
| 2013/0126231 A1 | 5/2013 | Kusakari et al. |
| 2015/0357072 A1 | 12/2015 | Kusakari et al. |
| 2021/0267097 A1* | 8/2021 | Coppola ............ H05K 7/20872 |

FOREIGN PATENT DOCUMENTS

JP      2018-125118 A      8/2018

OTHER PUBLICATIONS

International Search Report issued on Aug. 24, 2021 for WO 2021/221068 A1 (4 pages).

* cited by examiner

*Primary Examiner* — Timothy J Thompson
*Assistant Examiner* — Amol H Patel
(74) *Attorney, Agent, or Firm* — Venjuris, P.C.

(57) ABSTRACT

Disclosed is a covered wire including: a tubular member through which a coolant flows; a conductor provided on an outer circumference of the tubular member; and a covering member covering an outer circumference of the conductor, wherein the tubular member and the covering member are insulating, and the tubular member has a higher resistance to the coolant than the covering member.

6 Claims, 3 Drawing Sheets

COVERED WIRE

CROSS REFERENCE TO RELATED APPLICATIONS

This application is a national phase of PCT application No. PCT/JP2021/016840, filed on 27 Apr. 2021, which claims priority from Japanese patent application No. 2020-079825, filed on 28 Apr. 2020, all of which are incorporated herein by reference.

TECHNICAL FIELD

The present disclosure relates to a covered wire.

BACKGROUND

Patent Document 1 discloses a covered wire including a conductor, and an insulating covering layer covering the outer circumference of the conductor.

PRIOR ART DOCUMENT

Patent Document

Patent Document 1: JP 2017-053035 A

SUMMARY OF THE INVENTION

A covered wire according to the present disclosure includes: a tubular member through which a coolant flows; a conductor provided on an outer circumference of the tubular member; and a covering member covering an outer circumference of the conductor, wherein the tubular member and the covering member are insulating, and the tubular member has a higher resistance to the coolant than the covering member.

DETAILED DESCRIPTION TO EXECUTE THE INVENTION

Problems to be Solved by the Present Disclosure

The above-described covered wire does not have any cooling structure, and therefore heat dissipation from the conductor is achieved through natural cooling. Through natural cooling, it is difficult to effectively dissipate heat from the conductor. For this reason, the allowable current of the conductor is limited by a current value that is mainly dependent on the maximum allowable temperature of the insulating covering layer. This makes it difficult to increase the allowable current of the conductor. It is an object of the present disclosure to provide a covered wire that allows a conductor to be effectively cooled.

Effects of the Present Disclosure

A covered wire according to the present disclosure allows a conductor to be effectively cooled.

DESCRIPTION OF EMBODIMENTS OF THE PRESENT DISCLOSURE

First, aspects of the present disclosure will be listed and described.

(1) A covered wire according to one aspect of the present disclosure includes: a tubular member through which a coolant flows; a conductor provided on an outer circumference of the tubular member; and a covering member covering an outer circumference of the conductor, wherein the tubular member and the covering member are insulating, and the tubular member has a higher resistance to the coolant than the covering member.

The above-described embodiment allows the conductor to be effectively cooled. The reason is that, since the tubular member through which the coolant flows is disposed on the inner side of the conductor, heat can be dissipated from the conductor by the coolant flowing through the tubular member. Accordingly, when the current is constant, the above-described embodiment can reduce the cross-sectional area of the conductor, and thus can reduce the diameter. Alternatively, when the cross-sectional area of the conductor is constant, the above-described embodiment can increase the allowable current of the conductor.

(2) As one embodiment of the above-described covered wire, the conductor may include a plurality of strands made of metal.

In the above-described embodiment, the conductor includes the plurality of strands, and therefore is excellent in bendability.

(3) As one embodiment of the covered wire according to (2) above, the conductor may be a braided member formed by braiding the plurality of strands.

In the above-described embodiment, the conductor is formed by the braided member, and thus is even more easily bent, and is excellent in durability against bending. In addition, in the above-described embodiment, the outer diameter of the insulating covering is less likely to be relatively large.

(4) As one embodiment of the above-described covered wire, the coolant may be an antifreeze, and the resistance may be a chemical resistance.

The above-described embodiment allows the conductor to be effectively cooled over a long period of time even in cold regions, winter months, or the like. The reason is as follows. Since the coolant is an antifreeze, the coolant is less likely to be frozen even in cold regions, winter months, or the like. Since the tubular member has a high chemical resistance, the tubular member will not be damaged by the antifreeze.

(5) As one embodiment of the above-described covered wire, the covered wire may have a diameter greater than or equal to 3 mm and less than or equal to 40 mm.

In the above-described embodiment, since the above-described diameter is greater than or equal to 3 mm, the cross-sectional area of the conductor is easily increased, and thus the current to be passed is easily increased. In the above-described embodiment, since the above-described diameter is less than or equal to 40 mm, the covered wire is easily bent and routed.

(6) As one embodiment of the above-described covered wire, the covering member may have a heat-resistant temperature of 70° C. or more, and the covering member may have a volume resistivity of $10^9$ Ω·cm or more.

In the above-described embodiment, since the heat-resistant temperature of the covering member is 70° C. or more, the covering member is excellent in heat resistance. In the above-described embodiment, since the volume resistivity of the covering member is $10^9$ Ω·cm or more, the covering member is excellent in insulation.

(7) As one embodiment of the above-described covered wire, the tubular member may have a single-layered structure formed of a single type of resin.

In the above-described embodiment, since the tubular member is a single member formed of a single type of resin, it is possible to reduce the number of materials and increase the productivity as compared with a case where the tubular member has a layered structure formed of different resins.

(8) As one embodiment of the above-described covered wire, the tubular member may include a ridge portion protruding from an inner circumferential surface of the tubular member toward the center thereof.

In the above-described embodiment, the conductor is easily cooled more effectively. The reason is, for example, as follows. Due to the provision of the ridge portion, the contact area between the coolant and the tubular member is likely to be large. As compared with a case where the ridge portion is not provided, the area of the flow path on the inner circumferential surface side of the tubular member is easily reduced due to the provision of the ridge portion. Accordingly, when the flow rate of the coolant is constant, the flow velocity on the inner circumferential surface side is likely to be fast. As compared with a case where the ridge portion is not provided, the flow of the coolant in the vicinity of the inner circumferential surface of the tubular member is straightened, and therefore is likely to be laminar. Accordingly, the coolant and the tubular member effectively come into contact with each other.

(9) In one embodiment of the covered wire according to (8) above, a plurality of the ridge portions may be provided, and the plurality of the ridge portions may be arranged at an interval in a circumferential direction of the tubular member.

In the above-described embodiment, the conductor is easily cooled more effectively. The reason is that the flow of the coolant in the vicinity of the inner circumferential surface of the tubular member is likely to be uniform over the entire circumference.

(10) In one embodiment of the covered wire according to (9) above, the plurality of the ridge portions may extend linearly in an axial direction of the tubular member.

In the above-described embodiment, the pressure loss of the coolant is easily reduced as compared with a case where the plurality of ridge portions extend spirally relative to the axial direction of the tubular member. The reason is that, since the plurality of the ridge portions extend linearly in the axial direction of the tubular member, the coolant is easily caused to flow in the axial direction of the tubular member. In addition, the above-described embodiment is excellent in productivity. The reason is that, since the plurality of ridge portions extend linearly, the tubular member including the plurality of the ridge portions is excellent in manufacturability.

(11) In one embodiment of the covered wire according to (9) above, the plurality of the ridge portions may extend spirally relative to the axial direction of the tubular member.

In the above-described embodiment, the conductor is easily cooled uniformly in the longitudinal direction thereof as compared with a case where the plurality of the ridge portions extend linearly in the axial direction of the tubular member. The reason is as follows. Since the plurality of ridge portions extend spirally relative to the axial direction of the tubular member, the positions of the ridge portions in the circumferential direction are shifted at different positions in the axial direction. Accordingly, the coolant advances in the axial direction of the tubular member while its position in the circumferential direction is being shifted.

DETAILS OF EMBODIMENTS OF THE PRESENT DISCLOSURE

The details of embodiments of the present disclosure will be described below. In the drawings, identical reference numerals denote identical parts.

Embodiment 1

Covered Wire

Figure 1:
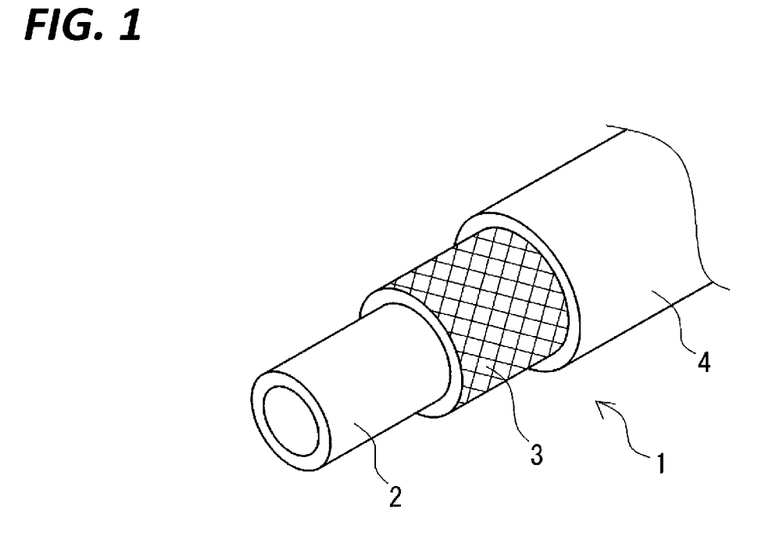
FIG. 1 is a perspective view schematically showing a covered wire according to Embodiment 1.
Figure 2:
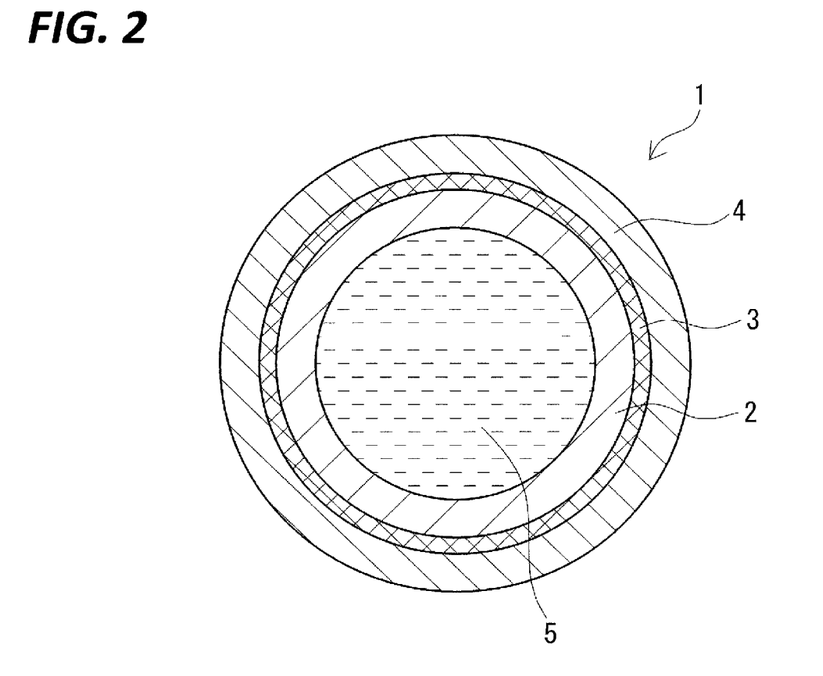
FIG. 2 is a cross-sectional view schematically showing the covered wire according to Embodiment 1.

Referring to FIGS. 1 to 3, a covered wire 1 according to Embodiment 1 will be described. As shown in FIGS. 1 and 2, the covered wire 1 according to the present embodiment includes a tubular member 2, a conductor 3, and a covering member 4 in this order from the center side. As shown in FIG. 2, a coolant 5 flows through the tubular member 2. One feature of the covered wire 1 according to the present embodiment lies in that the tubular member 2 has a higher resistance to the coolant 5 than the covering member 4. In the following, each of these components will be described in detail. FIG. 2 schematically shows the tubular member 2, the conductor 3, and the covering member 4, and the thicknesses shown therein do not necessarily match the actual thicknesses. This also applies to FIG. 5, which will be referred to in Embodiment 2 below.

Tubular Member

The tubular member 2 allows the coolant 5 to flow therethrough. The tubular member 2 is insulating. The term "insulating" means having the property of withstanding the working voltage of the conductor 3. The tubular member 2 has a higher resistance to the coolant 5 than the covering member 4. The term "resistance" refers to the property of a material forming the tubular member 2 or the covering member 4 that resists a performance reduction due to a physical and/or a chemical influence of the coolant 5. This resistance is a property depending on the type of the coolant 5. As will be described below, when the coolant 5 is an antifreeze or oil, examples of the resistance include a chemical resistance. Alternatively, when the coolant 5 is water, it is possible to heat water by removing heat from the conductor 3, and therefore examples of the resistance include a hot water resistance.

The chemical resistance is evaluated based on the rate of change in the insulation resistance value before and after a test performed in accordance with "JASO D 618 (2013) Automotive parts-Test methods for low-voltage cables". The hot water resistance is evaluated based on the rate of change in the insulation resistance value before and after a test performed in accordance with "ISO 6722-1 Road vehicles". That is, the expression "having a high resistance" means that the above-described rates of change of the tubular member 2 are higher than those of the covering member 4.

The material of the tubular member 2 may be a resin or a rubber, for example. The resin may be, for example, at least one selected from the group consisting of a polyamide resin, a silicone resin, a fluororesin, polyurethane, polyethylene, and polypropylene. The polyamide resin may be nylon 12, nylon 11, nylon 6, nylon 66, or nylon 9T, for example. The rubber may be, for example, at least one selected from the group consisting of an ethylene-propylene rubber, a silicone rubber, a urethane rubber, and a chloroprene rubber.

In the present embodiment, the shape of the tubular member 2 is a cylindrical shape. In the present embodiment, the tubular member 2 has a uniform thickness over the entire length of the tubular member 2 in the axial direction. The thickness of the tubular member 2 refers to a difference between the inner diameter and the outer diameter of the tubular member 2. The thickness, the inner diameter, and the outer diameter of the tubular member 2 can be selected as appropriate according to the use of the covered wire 1. Note that the tubular member 2 may be a tubular body having an elliptic cylindrical shape or a racetrack shape.

In the present embodiment, the tubular member 2 has a single-layered structure. That is, the tubular member 2 of the present embodiment is a single member formed of a single type of resin. Note that the tubular member 2 may be formed by a layered structure. In a layered structure, the material of at least one layer is different. Since the tubular member 2 is formed by a single-layered structure, it is possible to reduce the number of materials and increase the productivity as compared with a case where the tubular member 2 is formed by a layered structure.

The tubular member 2 can be produced through extrusion molding. The tubular member 2 having a layered structure can be produced through coextrusion of different materials.

Conductor

The conductor 3 is provided in contact with the outer circumference of the tubular member 2. The conductor 3 may include a plurality of strands, for example. Each strand may be formed only by a core wire made of metal, or may be formed by a core wire made of metal and a covering layer made of metal.

The metal forming the core wire may be, for example, at least one selected from the group consisting of copper, a copper alloy, aluminum, and an aluminum alloy. Copper or a copper alloy has a higher conductivity than aluminum and an aluminum alloy. That is, the covered wire 1 has a high conductivity when the core wire is formed of copper or a copper alloy. Aluminum or an aluminum alloy has a smaller weight than copper and a copper alloy. That is, the covered wire 1 has a small weight when the core wire is formed of aluminum or an aluminum alloy. The covering layer covers the outer circumference of the core wire. Specific examples of the covering layer include a plated layer. Examples of the metal forming the covering layer include tin. When the strand is formed of a core wire and a covering layer, typical examples of the strand include a tin-plated annealed copper wire in which the core wire is annealed copper and the covering layer is tin.

In the present embodiment, the conductor 3 is formed by a braided member formed by braiding a plurality of strands. Since the conductor 3 is formed by the braided member, the covered wire 1 is easily bent. Moreover, the covered wire 1 is excellent in durability against bending. The outer diameter of the covered wire 1 is less likely to be relatively large. When the conductor 3 is formed by a single braided member configured to have a tubular shape, the position of the braided member relative to the tubular member 2 is less likely to be shifted, or the braided member is less likely to be loosened, as compared with a configuration in which a plurality of band-shaped braided members are twisted together around the outer circumference of the tubular member 2. The braided member may be formed by braiding a plurality of units in each of which a plurality of strands are arranged, or may be formed by braiding a plurality of stranded wires each of which is formed by twisting strands together. The number of strands constituting each of the units and the cross-sectional area of the strand can be selected as appropriate. The conductor 3 may be formed by stacking a plurality of layers of braided members. Each braided member can be produced by braiding a plurality of strands around the outer circumferential surface of the tubular member 2, using the tubular member 2 as a core. In the case of stacking a plurality of layers of braided members, the conductor 3 may be produced by additionally braiding a plurality of strands around the outer circumference of a braided member braided around the outer circumferential surface of the tubular member 2. Accordingly, the braided members can be brought into sufficient contact with the tubular member 2. Thus, the heat dissipation from the braided member can be increased by the coolant 5 flowing through the tubular member 2.

Unlike the present embodiment, the conductor 3 may be formed by spirally winding, around the outer circumference of the tubular member 2, a plurality of stranded wires each formed by twisting a plurality of strands together. When the conductor 3 is formed by a plurality of stranded wires, the covered wire 1 is relatively easily bent. Moreover, the covered wire 1 also is relatively excellent in durability against bending. The conductor 3 may also be formed by spirally winding a plurality of strands around the outer circumference of the tubular member 2. The conductor 3 may also be formed by vertically attaching a plurality of strands to the outer circumference of the tubular member 2 so as to be linear in the axial direction of the tubular member 2. In the case of spirally winding or vertically attaching a plurality of strands without twisting the strands, the contact area of the plurality of strands with the tubular member 2 is likely to be large as compared with a case where the stranded wires are wound around the tubular member 2. Accordingly, the heat dissipation from the conductor 3 is likely to be high. The conductor 3 may be formed by a pipe member.

Covering Member

The covering member 4 covers the entire outer circumference of the conductor 3 in the circumferential direction. The covering member 4 is insulating. The term "insulating" means having the property of withstanding the working voltage of the conductor 3.

The heat-resistant temperature of the covering member 4 is preferably 70° C. or more, for example. The heat-resistant temperature refers to a temperature at which an elongation of 100% or more of the covering member 4 can be retained for 10000 hours. That is, the expression "having a heat-resistant temperature of 70° C. or more" means that an elongation of 100% or more of the covering member 4 can be retained at 70° C. for 10000 hours. Specifically, this means that {(Elongation of covering member 4 heated at 70° C. for 10000 hours)/(Elongation of covering member 4 before being heated)}×100≥100% is satisfied. The elongation is measured in accordance with "JIS C 3005 (2014) Test methods for rubber or plastic insulated wires and cables". When the covering member 4 has a heat-resistant temperature of 70° C. or more, the covering member 4 is excellent in heat resistance. The heat-resistant temperature of the covering member 4 is more preferably 90° C. or more, and particularly preferably 110° C. or more.

Note that the heat-resistant temperature may be evaluated by an accelerated test based on conditions calculated using an Arrhenius plot so as to correspond to 10000 hours. For example, the expression "having a heat-resistant temperature of 80° C." means that an elongation of 100% of the covering member 4 can be retained at 80° C. for 10000 hours, but also corresponds to that an elongation of 100% of the covering member 4 can be retained in an accelerated test at 120° C. for 625 hours.

The volume resistivity of the covering member 4 is preferably $10^9$ Ω·cm or more, for example. When the covering member 4 has a volume resistivity of $10^9$ Ω·cm or more, the covering member 4 is excellent in insulation. The volume resistivity of the covering member 4 is more preferably $10^{10}$ Ω·cm or more, and particularly preferably $10^{11}$ Ω·cm or more.

The material of the covering member 4 may be, for example, at least one selected from the group consisting of a crosslinked polyethylene, polyvinyl chloride, a crosslinked polyvinyl chloride, a fluororesin, a silicone rubber, an ethylene-propylene rubber, and a chloroprene rubber.

Size

The diameter of the covered wire 1 can be selected as appropriate according to the use of the covered wire 1. The covered wire 1 of the diameter may be, for example, greater than or equal to 3 mm and less than or equal to 40 mm. When the covered wire 1 has a diameter greater than or equal to 3 mm, the cross-sectional area of the conductor 3 is easily increased, and thus the current to be passed is easily increased. When the covered wire 1 has a diameter less than or equal to 40 mm, the covered wire 1 is easily bent. Moreover, the covered wire 1 is easily routed. Accordingly, the covered wire 1 is suitable for use in vehicles. The diameter of the covered wire 1 is more preferably greater than or equal to 4 mm and less than or equal to 30 mm, and particularly preferably greater than or equal to 5 mm and less than or equal to 20 mm.

Coolant

The coolant 5 flows through the tubular member 2. As a result of the coolant 5 flowing through the tubular member 2, the heat of the conductor 3 is removed by the coolant 5, and thus the conductor 3 is cooled and the coolant 5 is heated. The coolant 5 is a fluid. The fluid may be in the form of either a liquid or a gas. The type of the coolant 5 may be an antifreeze, water, oil, or air, for example. When the coolant 5 is an antifreeze, the coolant 5 is less likely to be frozen even in cold regions, winter months, or the like, and therefore the conductor 3 can be effectively cooled over a long period of time. When the coolant 5 is water or air, cost is easily reduced. The coolant 5 in the present embodiment is an antifreeze.

Circulation Device

The flow-through of the coolant 5 is achieved by a circulation device (not shown). The circulation device includes a first mechanism, a second mechanism, and a supply mechanism. The first mechanism is a connection mechanism for guiding the coolant 5 from the outside of the covered wire 1 into the tubular member 2. Although not shown, the first mechanism includes a first coolant pipe and a first connection part. The second mechanism is a connection mechanism for discharging the coolant 5 in the tubular member 2 to the outside of the covered wire 1. Although not shown, the second mechanism includes a second coolant pipe and a second connection part. The supply mechanism supplies the coolant 5 into the tubular member 2 of the covered wire 1. The supply mechanism includes a pump, a cooler, and a reservoir tank. The supply mechanism is interposed between the first mechanism and the second mechanism.

First Mechanism

The coolant 5 that has been cooled by a cooler described below flows through the first coolant pipe. The first connection part connects the first coolant pipe and the tubular member 2 to each other. The first connection part guides the coolant 5 from the first coolant pipe into the tubular member 2. The first connection part covers the outer circumference of the covered wire 1 on a first end portion side of the tubular member 2. The first end portion side of the covered wire 1 is stripped in a stepwise form. As a result of the first end portion side being stripped in a stepwise form, the first end portion side of the tubular member 2 is exposed. The first connection part covers the outer circumference of the exposed portion of the tubular member 2 on the first end portion side.

The first connection part is formed in a box shape. The first connection part has a first insertion hole and a connecting hole. The tubular member 2 of the covered wire 1 is passed through the first insertion hole. An inner circumferential surface of the first insertion hole and an outer circumferential surface of the tubular member 2 are in close contact with each other to the extent that the coolant 5 does not leak to the outside of the first connection part. Therefore, there is no need to separately provide a sealing member between the inner circumferential surface of the first insertion hole and the outer circumferential surface of the tubular member 2. Although not shown, when the inner circumferential surface of the first insertion hole and the outer circumferential surface of the tubular member 2 are not in close contact with each other, a sealing member for providing a seal therebetween is provided between the inner circumferential surface of the first insertion hole and the outer circumferential surface of the tubular member 2. The sealing member prevents the coolant 5 from leaking to the outside of the first connection part. The first coolant pipe is connected to the connecting hole.

Second Mechanism

The coolant 5 that has been heated in the process of flowing through the tubular member 2 flows through the second coolant pipe. The second connection part connects the tubular member 2 and the second coolant pipe to each other. The second connection part guides the coolant 5 from the inside of the tubular member 2 to the second coolant pipe. The second connection part covers the outer circumference of the covered wire 1 on a second end portion side of the tubular member 2. The second end portion side of the covered wire 1 is stripped in a stepwise form, as in the case of the first end portion side. As a result of the second end portion side being stripped in a stepwise form, the tubular member 2 on the second end portion side is exposed. The second connection part covers the outer circumference of the exposed portion of the tubular member 2 on the second end portion side. The second connection part is formed in a box shape. In the present embodiment, the configuration of the second connection part is the same as the configuration of the first connection part.

Supply Mechanism

The pump pumps the coolant 5 into the tubular member 2. This pumping causes the coolant 5 to flow into the tubular member 2 via the first coolant pipe and the first connection part, and to flow from the inside of the tubular member 2 to the cooler via the second connection part and the second coolant pipe. The pump is provided between the cooler and the first mechanism. The cooler cools the coolant 5 that has been heated as a result of passing through the tubular member 2. The cooling of the coolant 5 by the cooler may be either air cooling or water cooling. The reservoir tank temporarily stores the coolant 5. With the reservoir tank, it is possible to suppress damage of the tubular member 2 due to volume expansion of the heated coolant 5. The reservoir tank may be connected to the cooler, or may be provided between the second mechanism and the cooler.

Figure 3:
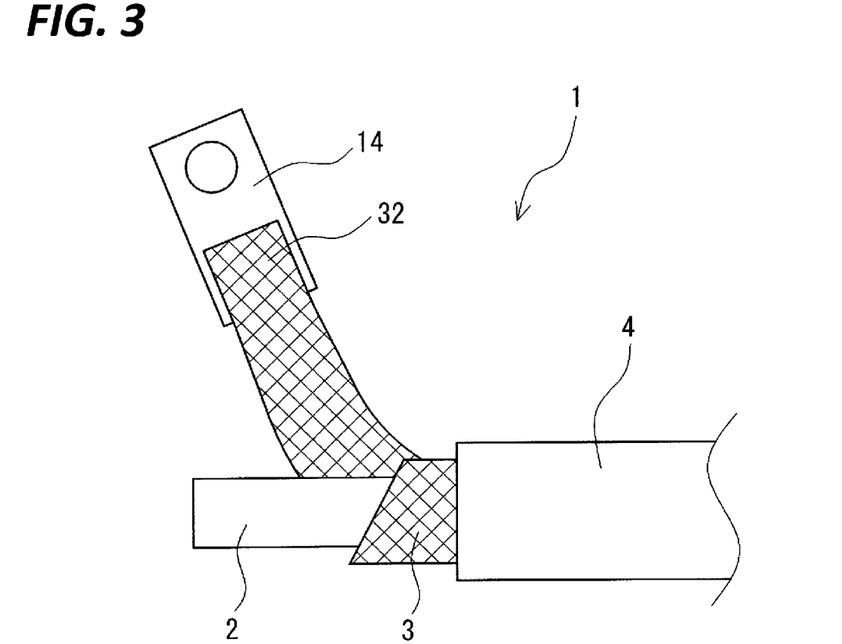
FIG. 3 is a side view schematically showing a state of attachment between a conductor and a terminal that are included in the covered wire according to Embodiment 1.

As shown in FIG. 3, the covering member 4 is removed at a distal end portion of the covered wire 1. Consequently, the conductor 3 is exposed from the covering member 4 at the distal end portion of the covered wire 1. The conductor 3 and the tubular member 2 are branched from each other at the portion where the conductor 3 is exposed. A terminal 14 is attached to a distal end portion 32 of the conductor 3. The terminal 14 is crimped to the conductor 3.

Use

The covered wire 1 of the present embodiment can be suitably used for automotive wiring. In particular, the covered wire 1 of the present embodiment can be suitably used for automotive wiring whose rated voltage is a high voltage. A high voltage refers to a voltage standardized in "JASO D 624 (2015) Automotive parts—high-voltage cables", and is greater than 30 V and less than or equal to 600 V for an alternating-current voltage, and greater than 60 V and less than or equal to 750 V for a direct-current voltage.

In-Vehicle System

Figure 4:
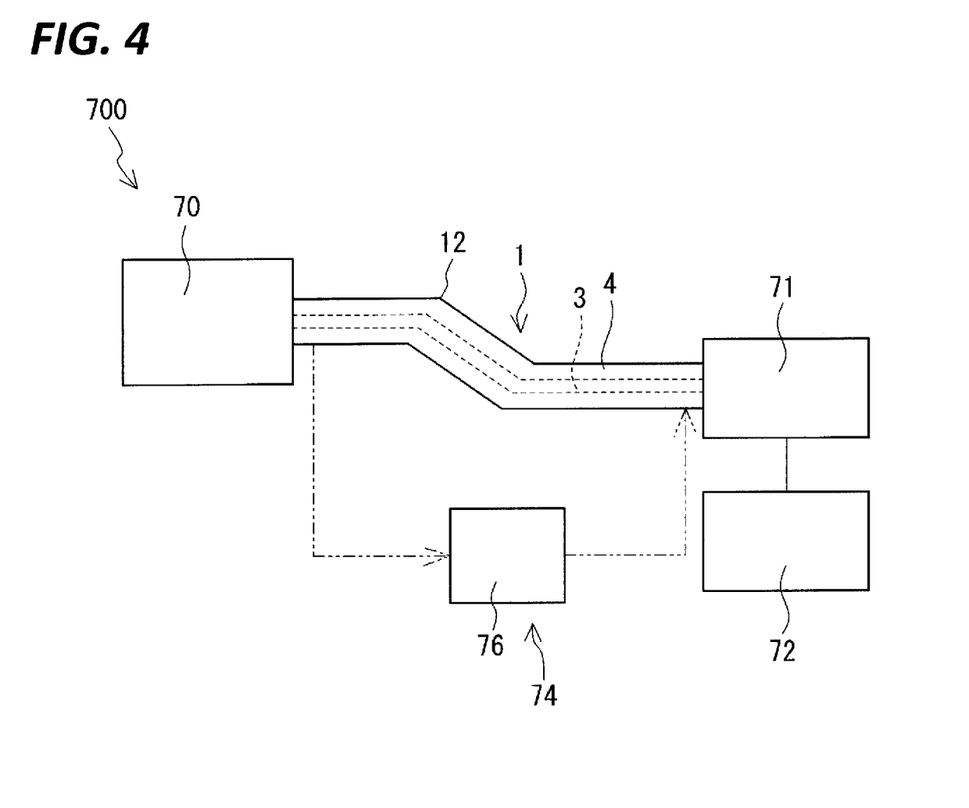
FIG. 4 is a schematic diagram showing an in-vehicle system in which the covered wire according to Embodiment 1 is used.

Referring to FIG. 4, an in-vehicle system 700 in which the covered wire 1 of the present embodiment is used will be described. FIG. 4 is a schematic diagram of the in-vehicle system 700, in which the in-vehicle system 700 is illustrated in a simplified manner for convenience of description.

The in-vehicle system 700 is used for a hybrid vehicle or an electric automobile, for example. The in-vehicle system 700 includes, for example, a battery 70, a PCU (Power Control Unit) 71, an auxiliary machinery 72, the covered wire 1 of the present embodiment, and a circulation device 74.

The battery 70 is a supply source of power. The battery 70 may be a secondary battery, for example, a lithium ion secondary battery.

The PCU 71 is disposed between the battery 70 and the auxiliary machinery 72. Examples of the PCU 71 include an inverter and a converter.

The auxiliary machinery 72 is operated by the power supplied from the battery 70. The auxiliary machinery 72 is an auxiliary machinery that is operated at a voltage higher than an ordinary voltage for an auxiliary machinery, and examples thereof include a motor used for traveling of a vehicle. The ordinary voltage for an auxiliary machinery may be 12 V or 24 V, for example.

The covered wire 1 is disposed between the battery 70 and the PCU 71. An inverter (not shown) is disposed between the battery 70 and the covered wire 1. The covered wire 1 includes the tubular member 2, the conductor 3, and the covering member 4, which have been described above with reference to FIG. 1. The conductor 3 is used as a conductive path between the battery 70 and the PCU 71. The covering member 4 includes the tubular member 2 through which the coolant 5 used for cooling the conductor 3 flows.

The covered wire 1 is bendable, and can be used while being partially bent, that is, while a bent portion 12 is formed therein. Therefore, the covered wire 1 can be routed so as to avoid the other members disposed in the vehicle. Since the covered wire 1 is bendable, the covered wire 1 can suitably absorb vibration occurring when the vehicle is moving. Accordingly, the covered wire 1 can electrically connect the battery 70 and the auxiliary machinery 72 to each other in a stable manner over a long period of five years or more in the in-vehicle system 700, for example.

The circulation device 74 includes a first mechanism and a second mechanism, which are not shown, and a supply mechanism 76 shown in FIG. 4. The first mechanism and the second mechanism may be the first mechanism and the second mechanism described above. The supply mechanism 76 may be the supply mechanism described above.

Note that the in-vehicle system 700 may be a system used for a fuel cell vehicle. In this case, the battery 70 may be a fuel cell. The auxiliary machinery 72 may be an air compressor that supplies a cathode gas to the fuel cell.

Operation and Effects

Since the tubular member 2 through which the coolant 5 flows is disposed on the inner side of the conductor 3, the covered wire 1 of the present embodiment allows the conductor 3 to be effectively cooled from the center side of the covered wire 1. Accordingly, when the current is constant, the covered wire 1 of the present embodiment can reduce the cross-sectional area of the conductor 3, and thus can reduced the diameter. Alternatively, when the cross-sectional area of the conductor 3 is constant, the covered wire 1 of the present embodiment can increase the allowable current of the conductor 3. Moreover, since the conductor 3 is formed by the braided member, the covered wire 1 of the present embodiment is easily bent, and is excellent in durability.

Embodiment 2

Covered Wire

Figure 5:
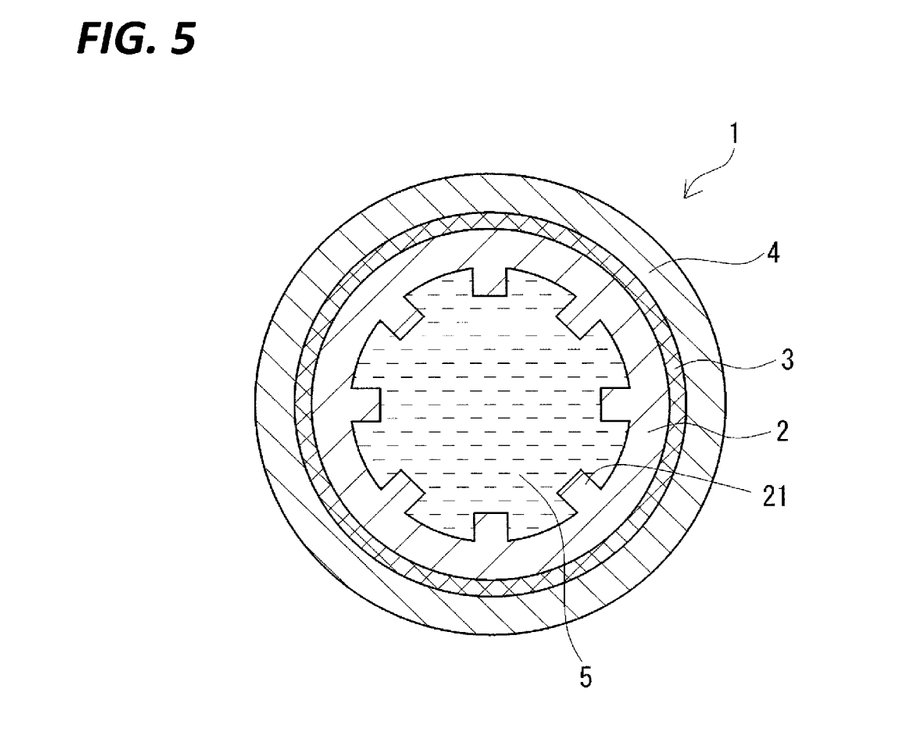
FIG. 5 is a cross-sectional view schematically showing a covered wire according to Embodiment 2.

Referring to FIG. 5, a covered wire 1 according to Embodiment 2 will be described. The covered wire 1 of the present embodiment is different from the covered wire 1 according to Embodiment 1 in that the tubular member 2 includes at least one specific ridge portion 21. The following description is focused on the difference from Embodiment 1. Descriptions similar to those of Embodiment 1 have been omitted.

Tubular Member

Ridge Portion

The ridge portion 21 protrudes from the inner circumferential surface of the tubular member 2 toward the center thereof. Due to the provision of the ridge portion 21, the contact area between the coolant 5 and the tubular member 2 is likely to be large. Accordingly, the conductor 3 is easily effectively cooled. Due to the provision of the ridge portion 21, the tubular member 2 of the present embodiment has portions having different thicknesses in the circumferential direction.

Unlike the present embodiment, when no ridge portion 21 is provided, the flow velocity of the coolant 5 in the vicinity of the inner circumference of the tubular member 2 is slower than that at the center of the tubular member 2. In addition, the flow of the coolant 5 in the vicinity of the inner circumferential surface of the tubular member 2 is turbulent as compared with that at the center of the tubular member 2. On the other hand, when the ridge portion 21 is provided as in the present embodiment, the cross-sectional area of the flow path in the vicinity of the inner circumferential surface of the tubular member 2 is likely to be smaller than that when no ridge portion 21 is provided. Therefore, when the flow rate of the coolant 5 is constant, the flow velocity of the coolant 5 in the vicinity of the inner circumferential surface of the tubular member 2 is likely to be fast. In addition, the flow of the coolant 5 in the vicinity of the inner circumferential surface of the tubular member 2 is straightened, and thus is likely to be laminar. When the flow of the coolant 5 is laminar rather than turbulent, the coolant 5 and the tubular member 2 are likely to be effectively come into contact with each other. Accordingly, when the tubular member 2 includes the ridge portion 21, the covered wire 1 allows heat to be easily dissipated from the conductor 3.

One ridge portion 21 or a plurality of ridge portions 21 may be provided. When a plurality of ridge portions 21 are provided, the plurality of ridge portions 21 may be arranged at intervals in the circumferential direction of the tubular member 2 in any given cross section. The intervals between the ridge portions 21 that are adjacent to each other in the circumferential direction are preferably equal. When the aforementioned intervals are equal, the flow of the coolant 5 in the vicinity of the inner circumferential surface of the tubular member 2 is likely to be uniform over the entire circumference.

The plurality of ridge portions 21 may extend linearly in the axial direction of the tubular member 2, or may extend spirally relative to the axial direction of the tubular member 2.

When the plurality of ridge portions 21 extend linearly, the pressure loss of the coolant 5 is more easily reduced than when the plurality of ridge portions 21 extend spirally relative to the axial direction of the tubular member 2. The reason is that the coolant 5 is easily caused to flow in the axial direction of the tubular member 2. When the plurality of ridge portions 21 extend linearly, the manufacturability of the tubular member 2 having the plurality of ridge portions 21 is better than that when the plurality of ridge portions 21 extend spirally relative to the axial direction of the tubular member 2. Thus, the productivity of the covered wire 1 is better.

When the plurality of ridge portions 21 extend spirally, the conductor 3 is more easily cooled uniformly in the longitudinal direction thereof than when the plurality of ridge portions 21 extend linearly in the axial direction of the tubular member 2. The reason is that the positions of the ridge portions 21 in the circumferential direction are shifted at different positions in the axial direction, and thus the coolant 5 advances in the axial direction of the tubular member 2 while the direction thereof in the circumferential direction is being shifted.

In the present embodiment, eight ridge portions 21 are provided. The eight ridge portions 21 are provided at equal intervals in the circumferential direction in any given cross section. The eight ridge portions 21 extend linearly in the axial direction of the tubular member 2.

Examples of the cross-sectional shape of each ridge portion 21 include a rectangular shape, a triangular shape, a trapezoidal shape, and a semi-circular shape. The cross-sectional shapes of the plurality of ridge portions 21 may be identical to each other. Note that at least one ridge portion 21 may have a different cross-sectional shape.

The protruding height of each ridge portion 21 is, for example, preferably greater than or equal to 5% and less than or equal to 50% of the inner radius of the tubular member 2. The protruding height refers to a maximum length in the radial direction of the tubular member 2. When the protruding height is greater than or equal to the aforementioned lower limit value, the cross-sectional area of the flow path in the vicinity of the inner circumferential surface of the tubular member 2 is likely to be small. When the protruding height is less than or equal to the aforementioned upper limit value, the protruding height is not excessively high. Therefore, the internal space of the tubular member 2 is less likely to be excessively small. Accordingly, the flow rate of the coolant 5 is less likely to be small. Moreover, the heat dissipation from portions of the conductor 3 that are located on the outer side of the portions where the ridge portions 21 are provided is less likely to be reduced. The protruding height is more preferably greater than or equal to 10% and less than or equal to 40%, and particularly preferably greater than or equal to 15% and less than or equal to 35%, of the inner radius of the tubular member 2. When the protruding height is greater than or equal to 20% of the inner radius of the tubular member 2, the ridge portions 21 come into contact with each other when the covered wire 1 is suddenly bent, and it is thus possible to suppress a blockage.

The interval between the ridge portions 21 depends on the number of ridge portions 21 and the inner diameter of the tubular member 2, but is, for example, preferably greater than or equal to 30% and less than or equal to 50% of the circumference of the inner circumferential surface of the tubular member 2. The interval refers to a minimum length in the circumferential direction between adjacent ridge portions 21. When the interval is greater than or equal to the aforementioned lower limit value, the cross-sectional area of the flow path in the vicinity of the inner circumferential surface of the tubular member 2 is less likely to be excessively small. When the interval is less than or equal to the aforementioned upper limit value, the cross-sectional area of the flow path in the vicinity of the inner circumferential surface of the tubular member 2 is likely to be small. The width of each ridge portion 21 depends on the number of ridge portions 21 and the inner diameter of the tubular member 2, but can be selected as appropriate within a range that satisfies the above-described interval. The width refers to a maximum length in the circumferential direction.

As in the case of Embodiment 1, the tubular member 2 including the ridge portions 21 can be produced through extrusion molding. The tubular member 2 in which the ridge portions 21 extend spirally can be produced using a rotary die during extrusion molding.

Operation and Effects

By having the same configuration as that of the Embodiment 1, the covered wire 1 of the present embodiment achieves the same effects as those achieved by Embodiment 1. By including the ridge portions 21, the covered wire 1 of the present embodiment can increase the effect of cooling the conductor 3.

The present invention is defined by the claims, rather than being limited to the above-described examples, and intended to include all modifications which fall within the scope of the claims and the meaning and scope of equivalents thereof.

LIST OF REFERENCE NUMERALS

1 Covered wire
12 Bent portion,
14 Terminal
2 Tubular member,
21 Ridge portion
3 Conductor,
32 Distal end portion
4 Covering member
5 Coolant
700 In-vehicle system
70 Battery,
71 PCU,
72 Auxiliary machinery,
74 Circulation device,
76 Supply mechanism

What is claimed is:

1. A covered wire comprising:
a tubular member through which a coolant flows;
a conductor provided on an outer circumference of the tubular member; and
a covering member covering an outer circumference of the conductor,
wherein
the conductor is formed of an annular structure having a constant cross-sectional area, the annular structure providing an inner surface contacting the outer circumference of the tubular member and providing an outer surface contacting an inner circumference of the covering member,
the conductor includes a plurality of strands made of metal,
the tubular member and the covering member are insulating, and
the tubular member has a higher resistance to the coolant than the covering member.

2. The covered wire according to claim 1, wherein the conductor is a braided member formed by braiding the plurality of strands.

3. The covered wire according to claim 1, wherein
the coolant is an antifreeze, and
the resistance is a chemical resistance.

4. The covered wire according to claim 1, wherein the covered wire has a diameter greater than or equal to 3 mm and less than or equal to 40 mm.

5. The covered wire according to claim 1, wherein
the covering member has a heat-resistant temperature of 70° C. or more, and
the covering member has a volume resistivity of $10^9$ Ω·cm or more.

6. The covered wire according to claim 1, wherein the tubular member has a single-layered structure formed of a single type of resin.

* * * * *